United States Patent [19]
Turk et al.

[11] Patent Number: 5,524,143
[45] Date of Patent: Jun. 4, 1996

[54] ANTI-STUFFING COIN REALIGNER

[76] Inventors: Nathan N. Turk; A. A. Turk; Steven R. Turk, all of Rocking Horse Ranch, 600 Rte. 44-55, Highland, N.Y. 12528-2217

[21] Appl. No.: 343,615

[22] Filed: Nov. 22, 1994

Related U.S. Application Data

[63] Continuation of Ser. No. 3,410, Jan. 12, 1993, abandoned.

[51] Int. Cl.$^6$ .......................... H04M 17/00; H04M 9/00; H04M 1/00
[52] U.S. Cl. .......................... 379/150; 379/143; 379/145; 379/155; 379/437; 379/451; 194/202; 194/203; 194/344
[58] Field of Search .................... 379/143, 145, 379/150, 155, 437, 451; 194/202, 203, 344

[56] References Cited

U.S. PATENT DOCUMENTS

| | | | |
|---|---|---|---|
| 4,246,451 | 1/1981 | Nix | 379/451 |
| 4,254,308 | 3/1981 | Blomeyer et al. | 379/143 |
| 4,491,213 | 1/1985 | Marcroft | 194/344 |
| 4,591,042 | 5/1986 | Wenner | 194/344 |
| 4,662,501 | 5/1987 | Partridge | 194/344 |
| 4,911,280 | 3/1990 | Bruner | 194/344 |
| 4,928,299 | 5/1990 | Tansky et al. | 379/143 |
| 5,018,193 | 5/1991 | De Arkland | 379/145 |
| 5,102,038 | 4/1992 | Anello | 379/150 |
| 5,131,035 | 7/1992 | Ohayon | 379/143 |
| 5,133,528 | 7/1992 | Vogl et al. | 379/437 |
| 5,134,654 | 7/1992 | McGough | 379/451 |
| 5,145,046 | 9/1992 | Satoh | 194/203 |
| 5,146,492 | 9/1992 | Stone et al. | 194/202 |
| 5,148,476 | 9/1992 | Zausner | 379/143 |
| 5,150,403 | 9/1992 | Jordan | 379/155 |
| 5,236,339 | 8/1993 | Nishiumi | 194/203 |

*Primary Examiner*—Stephen Chin
*Assistant Examiner*—Vijay Shankar
*Attorney, Agent, or Firm*—Joseph B. Taphorn

[57] ABSTRACT

A mechanism prevents explosion damage to coin pay telephones by providing an almost horizontal offset in the coin path so that a wad of paper cannot be moved by the weight of subsequently inserted coins. For existing phones, a retrofit provides a horizontal offset by locating a horizontal slot to one side of the existing coin chute entrance and having in back of it a relatively horizontal slippery surface for sliding the coin sideways and then downwards into a tunnel in alignment with the existing coin chute. The tunnel has a sloping bottom surface so that the coin rolls therein under the force of gravity into the existing coin chute. In another embodiment, the horizontal slot is further arranged perpendicular to the existing slot and the relatively horizontal slippery surface slides the coin back towards the horizontal slot and then downwards into the tunnel with a bottom sloping surface operative to roll the coin into the existing coin chute. The mechanism may also be integrally incorporated in the design of new telephones.

16 Claims, 3 Drawing Sheets

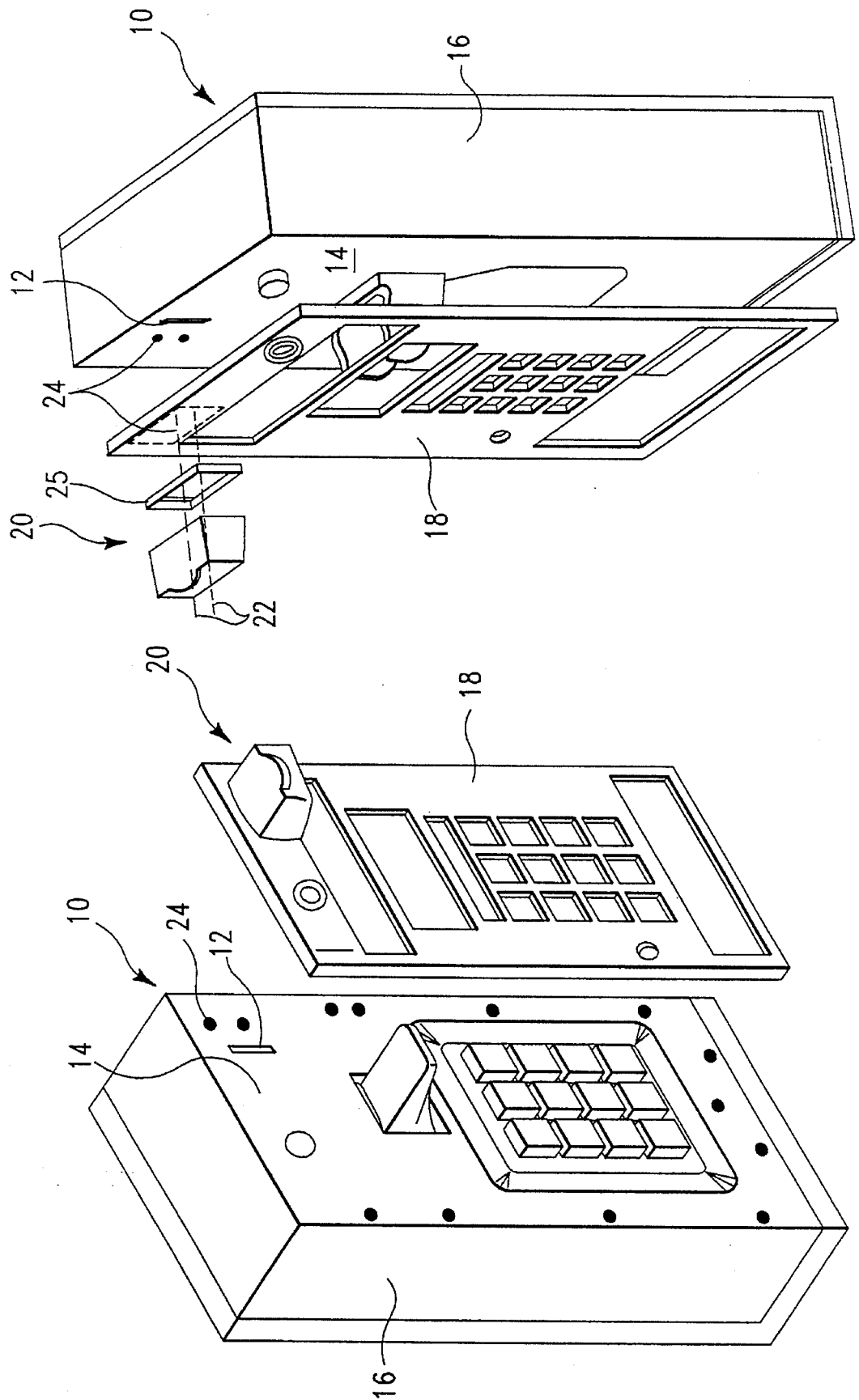

ANTI-STUFFING COIN REALIGNER

This is a continuation of application Ser. No. 08/003,410, filed on Jan. 12, 1993, now abandoned.

INTRODUCTION

1. Field of the Invention

This invention relates to coin telephone security devices, and more particularly to such security devices for protecting the computer and other mechanism in pay telephones from vandalism.

2. Background of the Invention

Vandalism of coin operated public pay phones is one of the biggest problems facing public and private telephone companies. Pay phones are exposed day and night to professional and amateur criminals who find the significant somes of money collected therein on a continuous basis, a serious temptation. The exposed and isolated nature of pay phone installations renders the vandalism acts relative safe for the criminal.

Modern day pay telephones include a computer and other electrical mechanisms. The computer will alert a central office when the pay phone is being tampered with. Thus a favorite ploy of the would-be vandal is to first disable the computer. This is done by stuffing foreign material such as paper, cotton, match books, etc., into the coin entry or insert slot to block the coins thereafter inserted by would-be regular customers, from passing down into the lower part of the telephone box. After a period of time, the vandal returns and pours lighter fluid or the like into the coin entry slot and down the chute behind it to soak the paper with the lighter fluid, the paper having been pushed down to the bottom of the chute by the force of gravity (weight of) acting on the coins behind it. He then ignites the lighter fluid to blow the telephone box to appropriate the blocked and other coins. In the process, the computer and other mechanisms are damaged, if not destroyed. Once the computer has been disabled, the coin box of the pay phone may be rifled with relative impunity.

Besides the loss of the collected coins, the phone company is subjected to the cost of replacement parts and repair beside the loss of revenue while the damaged pay phones render the pay phone inoperable or incapable of recording the calls being made. Consumers may be disadvantaged by the damaged pay phone as by it not being available for summoning emergency services such as fires trucks and ambulances.

SUMMARY OF THE INVENTION

Accordingly, it is an object of the invention to reduce the damage that may be done to coin operated pay phones by acts of vandalism.

Another object of the invention is to increase the availability time of coin operated pay phones to consumers.

Still another object of the invention is to protect the computer and other mechanisms of pay phones from damage or destruction.

Yet another object of the invention is to reduce the parts replacement and repair costs for vandalized pay phones.

A further object of the invention is to protect from pilferage the coins collected by pay phones.

A related object of the invention is to protect the telephone company from unpaid or unrecorded telephone calls.

A still further object of the invention is to encourage the installation of pay telephones in high crime areas for the benefit of the average citizen.

Yet another object of the invention is to encourage the installation of pay telephones in poor or ghetto areas where individual or family phones are a rarity.

An additional object of the invention is to provide a simple and easy fix against such vandalism, as well as one that is inexpensive of construction.

The objects of the invention are achieved by effecting a path change for inserted coins. Generally coin pay telephones have a vertical slot for the insertion of coins. The inserted coin slides down a chute behind the slot to a coin detection and cents counting mechanism utilizing the computer.

Devices according to the present invention involve inserting the coins upon a nearly horizontal surface. To this end, a horizontal coin insert slot and a nearly horizontal surface are provided to one side of the existing vertical slot, for lateral displacement and tilting of the inserted coin so that it is received for rolling action in the chute behind the telephone box vertical slot. The requirement for lateral displacement and tilting prevents movement of a vandal's inserted foreign material such as wads of paper, by subsequently inserted coins. Furthermore, gravity is essentially removed as an operative force to push the wad of paper beyond the insert slot.

An advantage of the invention is that it allows for retrofitting of the invention on existing coin pay telephones.

A feature of the invention is a mounting that precludes easy removal of the retrofit from pay telephones, so that the security of the retrofit equals that of the pay phone generally.

BRIEF DESCRIPTION OF THE DRAWINGS

These and other objects, features and advantages of the invention will become apparent from a reading of the following description of preferred embodiments of the invention when considered with the accompanying drawings wherein:

FIG. 1 is a perspective view of the front and left and top side of a coin pay telephone box having a vertical coin insert slot in the upper right of its front side, with the front cover exploded and showing a retrofit according to the present invention mounted thereon;

FIG. 2 is a perspective view of the front and right and top side of a coin pay telephone box having a vertical coin insert slot in the upper left of its front side, with the front cover exploded and showing a retrofit according to the present invention exploded therefrom;

FIG. 8 is a diagrammatic view in perspective of the internals of a retrofit like that of FIG. 5 as seen from the right front and above, to show the action of inserted coins.

DETAILED DESCRIPTION OF PREFERRED EMBODIMENTS OF THE INVENTION

Figure 3:
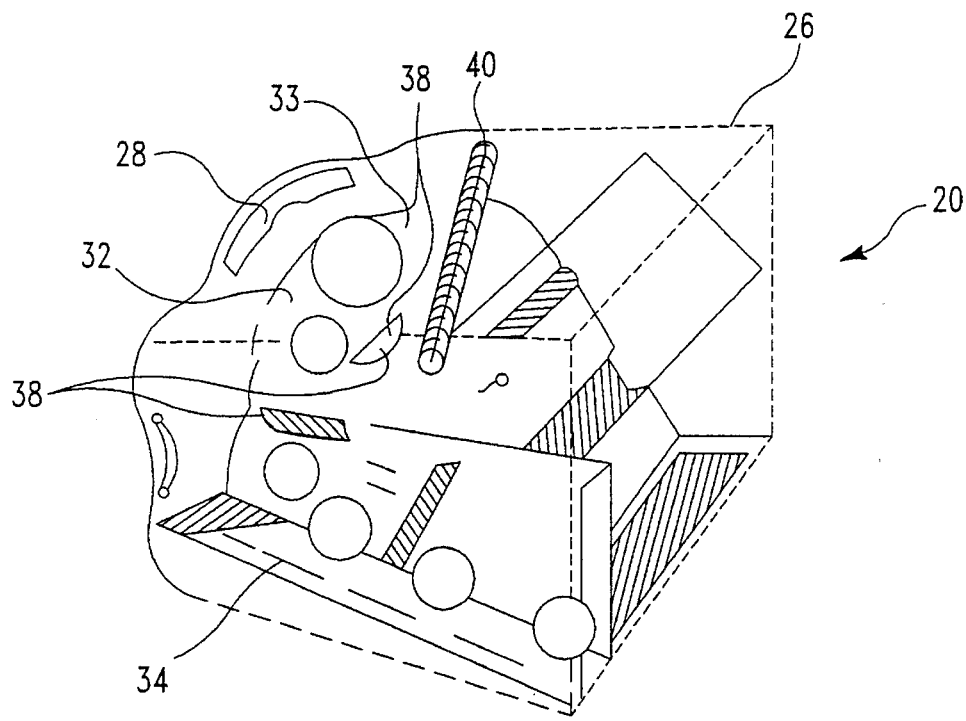
FIG. 3 is a diagrammatic view in perspective of the internals of the retrofit of FIG. 1 as seen from the right rear and above in FIG. 1.

Referring now to the drawings, a coin pay telephone box generally indicated by the numeral 10, has a vertical coin entry slot 12 for a generally straight coin path in the upper right of the the front face 14 of its housing 16. A cover plate 18 shown in exploded view, has openings in it for providing access to the elements on the housing front face 14 including the vertical coin entry slot 12. A retrofit according to the invention is generally indicated at 20 and covers the opening therein for the vertical coin entry slot 12 in the front face 14 of the housing 16.

The retrofit 20 is also adapted to work with coin pay telephones wherein the vertical coin entry slot is on the upper left hand side of the front of the telephone box. Thus in FIG. 2, there is shown such a telephone box with the normally vertical slot 12 covering retrofit 20 exploded to show also mounting details. As suggested by the dotted lines 22 and apertures 24 in both the housing face 14 and cover plate 18, screws would extend from inside the housing 16 to be threadedly received within the retrofit 20 and secure it and a weather sealing gasket 25 against the cover plate 18 and housing 16 to prevent its ready removal by vandals. The retrofit for the coin pay telephone having its vertical slot on the left hand side (FIG. 2) differs from that for the telephone having its vertical slot on the right hand side (FIG. 1) by translating an inserted coin to the left instead of to the right, as will hereinafter become apparent.

Figure 4:
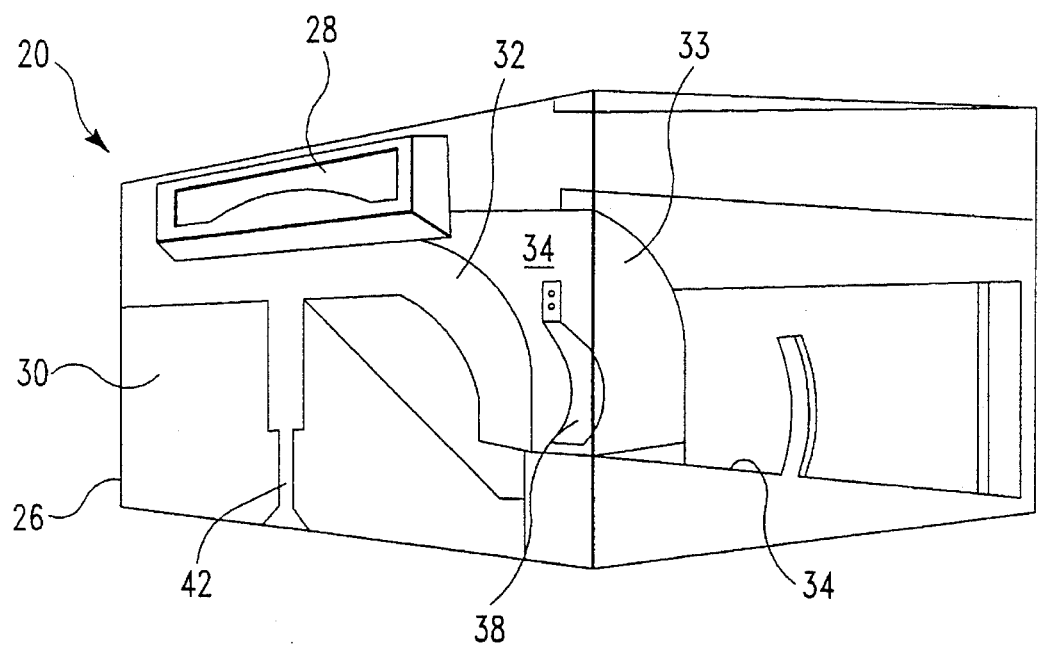
FIG. 4 is a diagrammatic view in perspective of the internals of the retrofit of FIG. 1 as seen from the right front and below in FIG. 1.
Figure 5:
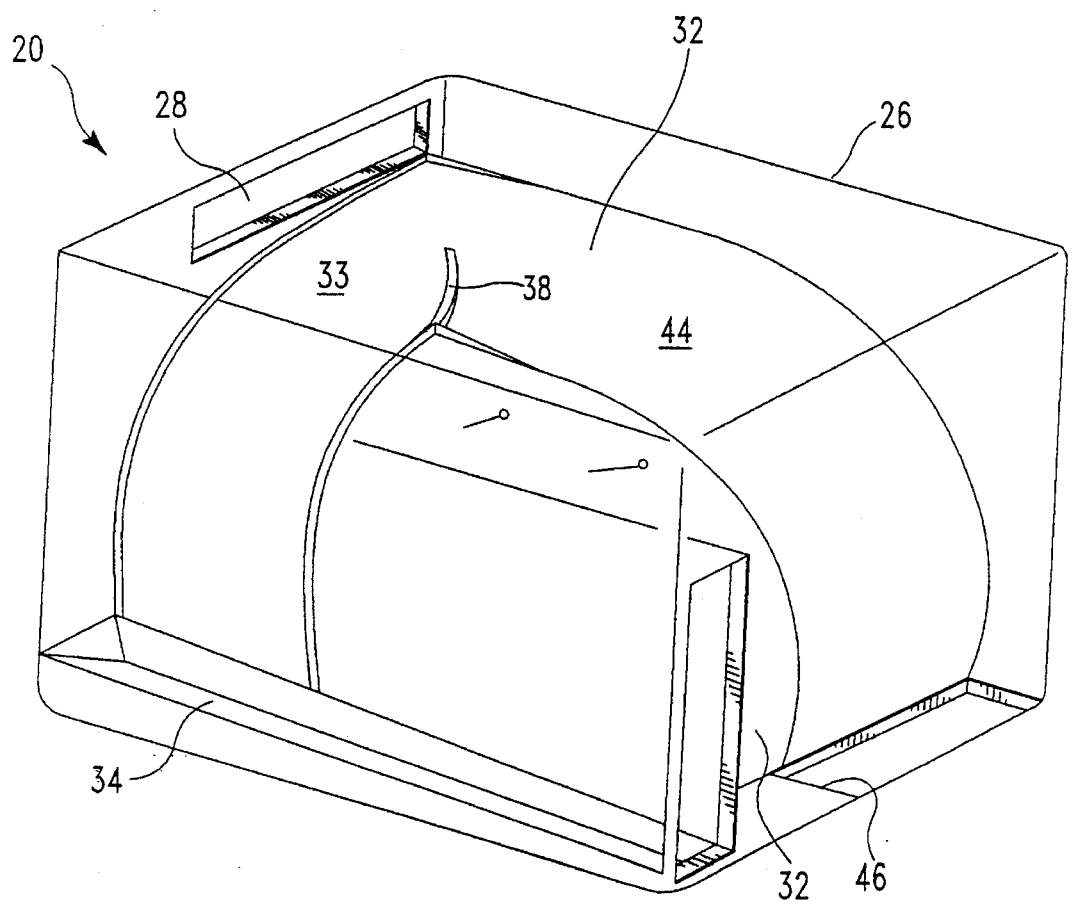
FIG. 5 is an enlarged diagrammatic view in perspective of a portion of the internals shown in FIG. 3.

A retrofit for a telephone having a vertical slot on the right is shown in greater detail in FIGS. 3, 4, and 5. The retrofit 20 includes a somewhat-square box-like housing 26 having a horizontal coin entry slot 28 in its front face 30. As best seen in FIG. 5, a block 32, of a low friction or slippery material such as nylon or teflon, is secured in place as by the gluing of its left hand side with the left side wall of the housing 26 and/or of its bottom side with the bottom of the housing 26. The upper surface 33 of the block 32 immediately behind the slot 28 has a portion which slopes downwardly to the right to where it is vertical; it is of a width slightly exceeding that of the largest coin usable in the telephone. The vertical surface is spaced slightly more than the largest coin's thickness from the right side wall of the housing 26 to define a tunnel in which a coin deposited therein may roll rearwards. Rearwards rolling of the coin in the tunnel is achieved by providing in the bottom of the tunnel an inclined plane or surface 34 sloping rearwardly. The rear end of the tunnel is aligned with the vertical slot 12 in the telephone housing 14 to deliver under the influence of gravity any inserted coin thereinto for normal processing.

A coin inserted through the opening 28 will fall on the block surface 33 (which slopes downward to the right) and translate to the right. The coin will contine sliding downwards to the right and reach a vertical or tilted position in the tunnel on the sloping surface 34 which will cause it to roll to the rear and when retrofit is mounted on the pay telephone into the telephone box vertical slot 12.

Wires 38 secured in the block 32 serve to guide the coins on the surface 33 and in the tunnel. They also serve to engage and catch any wad of paper endeavoring to move down the coin path. A spring bar 40 mounted in suitable slots in the side of the housing 26 side walls, provides a means for yieldably urging any stuck coin onwards. A screw 42 threaded into the bottom of the front end of the block 32 and reacting with the floor of the housing 26 may be used to align precisely the block surface 33 with the coin entry slot 28. The upper surface 33 of the block 32 may also be formed behind the upper wire 38 with a rearwardly and downwardly sloping surface 44 leading to a coin return opening 46 in the floor of the retrofit to return coins to a would be user if the upper wire 38 was broken off as by vandalism at an earlier date. It may also direct any would-be vandal's foreign material out of the telephone box without damaging its internals.

Retrofits 20 for telephone boxes having the vertical coin entry slot 12 on the left will have their block surfaces 33 sloping downwards to the left to a tunnel on the left side of it and with a rearwardly sloping inclined plane 36.

Figures 6, 7:
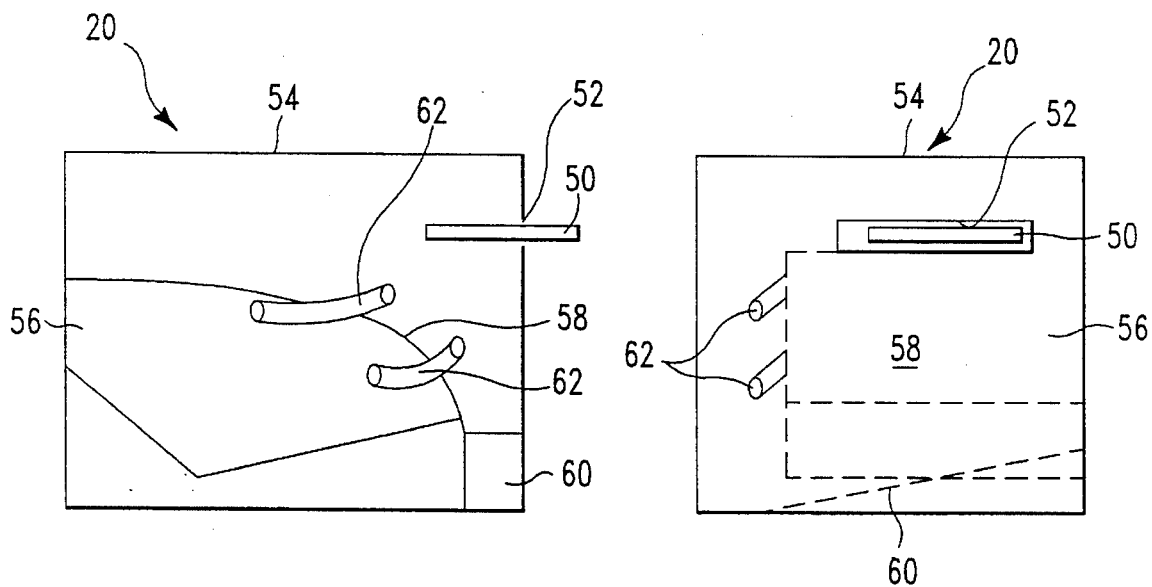
FIG. 6 is a side sectional diagrammatic view of the internals of another retrofit embodiment of the invention.
FIG. 7 is a front view of the retrofit of FIG. 6.

The principles of the invention may also be embodied in a retrofit wherein the coin entry slot further is disposed sidewise to the telephone box vertical entry slot 12. This embodiment is shown in FIGS. 6 and 7. In this embodiment, shown for a coin pay telephone having its vertical slot on its front upper left hand side (as in FIG. 2), a coin 50 is inserted from the left (as mounted on the telephone) through a slot 52 in the left hand side (as mounted) of the retrofit housing 54. A block 56, of a low friction material such as nylon or teflon, is secured as by glue to the front and/or right hand side wall of the housing 54. This block is formed with a sidewise (with respect to the retrofitting direction, but forwardly with respect to coin insertion direction) and downwardly extending sliding surface 58 on which the coin 50 inserted through the slot 52 slides sidewise and downwardly into a tunnel formed between the block 56 and the left side wall of the housing 54 and in which it rolls on a sloping surface 60 rearwardly into the aligned vertical slot 12 of FIG. 2. Wire guides 62 mounted in the block 56 insure that the coin takes the proper path but deter paper wad progression.

It will be observed that the pay telephone coin path for the mounted retrofit of each embodiment is such as not to provide an essentially downward path enabling a wad of paper inserted by a vandal through the horizontal slot to reach the coin pay telephone's coin chute, let alone the bottom of the chute where its ignition after being soaked with lighter fluid damages the coin detecting mechanism and computer. Thus in the embodiment of FIGS. 1–5, an inserted wad of paper would not be pushed sidewise by the weight of coins later inserted behind it into the horizontal slot; rather it would be pushed forward by the coin inserter's insert force to go over the block surface 44 and out the opening 46 rather than make a right hand turn after entering the slot 28, a ninety degrees downward turn thereafter, and a ninety degree left hand turn in the tunnel to enter the vertical slot 12. The wire nature of the guides 38 and their spacing from the block surface 34 is such that they will engage any inserted wad of paper to impede or stop its travel.

In the embodiment of FIGS. 6 and 7, a vandal's wad of paper inserted through the slot 52 must reverse itself and tilt to enter the tunnel. It is too light to do this by itself, and thus it blocks the horizontal entrance slot by not getting out of the way. Furthermore any coins inserted will not get behind it but at best get on top of it where they are unable to apply a force having a sufficient downward component on the initial portion of the relatively flat surface 58 to move the wad of paper sidewards and downwards into the tunnel, let alone further down the tunnel.

It will also be observed that that the retrofit devices of the present invention are simple in manufacture, installation and operation: they involve normally no moving parts except the coin itself; and the stationary parts are few, being just a housing, a slippery material block providing a sliding surface for translating and tilting an inserted coin, and a tunnel having a sloping bottom surface for rolling the coin to the vertical coin entry slot.

While there have been shown preferred embodiments of the invention, it will also be apparent to those skilled in the art that other and different applications may be made of the principles of the invention. It is intended to be limited only by the spirit or scope of the appended claims.

What is claimed is:

1. In a compact retrofit coin telephone high anti-stuffing security device for mounting over the vertical coin entry slot of a pay telephone, a housing having a horizontal coin entry slot non-aligned with the vertical coin entry slot when the retrofit device is mounted on the pay telephone, a structure immediately behind the horizontal coin entry slot of a depth slightly exceeding that of largest coin usable in the pay telephone for receiving and sliding laterally and tilting a coin inserted into the housing coin entry slot and rolling it into the vertical coin entry slot, and an object limiting rearward movement of the coin on the structure to a depth slightly exceeding the width of the largest coin usable in the pay telephone.

2. A device according to claim 1, wherein the structure translates the coin and tilts it into a tunnel in alignment with the telephone coin entry slot and includes a sloping surface in the bottom of the tunnel for rolling the tilted coin into the vertical coin entry slot.

3. A device according to claim 1, wherein the structure includes a block with a slippery surface.

4. A device according to claim 3, wherein the slippery surface is slightly inclined to the horizontal so that a coin placed thereon will slide away.

5. A device according to claim 3, wherein the slippery surface eventually curves downward and translates the coin in a direction at least ninety degrees to the direction of its slot entry path.

6. A device according to claim 5, wherein the slippery surface translates the coin sidewise to the direction of its slot entry path.

7. A device according to claim 5, wherein the slippery surface translates the coin forward to the direction of slot entry.

8. A device according to claim 3, wherein the slippery surface translates the coin and tilts it into alignment with the vertical coin entry slot.

9. A device according to claim 6, wherein the slippery surface translates the coin sidewise to the direction of its slot entry path and tilts it into alignment with the vertical coin entry slot.

10. A device according to claim 6, wherein the slippery surface translates the coin forward to the direction of its slot entry path and tilts it into alignment with the vertical coin entry slot.

11. A device according to claim 5, and wires on the block to guide the coin on the slippery surface.

12. A device according to claim 8, and wires on the block to guide the coin on the slippery surface.

13. A device according to claim 8, and a movable spring for dislodging a stuck coin.

14. A coin pay telephone having coin detection mechanism subject to vandalism including a computer, a vertical coin entry slot, an upright path leading down to the coin detection mechanism from the vertical coin entry slot, a nearby horizontal coin entry slot offset from the vertical coin entry slot for high anti-stuffing purposes, a block having a sloping surface of a depth slightly exceeding that of largest coin usable in the pay telephone to one side and a slippery surface immediately behind the horizontal coin entry slot for receiving and sliding sidewise and tilting an inserted coin from a position behind the horizontal coin entry slot to a position on the sloping surface for rolling through the vertical coin entry slot into the upright path, and an object limiting rearward movement of the coin on the block to a depth slightly exceeding the width of the largest coin usable in the pay telephone.

15. A coin pay telephone having coin detection mechanism subject to vandalism including a computer, a vertical coin entry slot, an upright path leading down to the coin detection mechanism from the vertical coin entry slot, a nearby horizontal coin entry slot offset from the vertical coin entry slot for high anti-stuffing purposes, a block having a sloping surface of a depth slightly exceeding that of largest coin usable in the pay telephone to one side and a slippery surface immediately behind the horizontal coin entry slot for receiving and for sliding in a direction opposite to entry and tilting an inserted coin from a position behind the horizontal coin entry slot to a position on the sloping surface for rolling through the vertical coin entry slot into the upright path, and an object limiting rearward movement of the coin on the block to a depth slightly exceeding the width of the largest coin usable in the pay telephone.

16. A coin pay telephone having a coin detection mechanism subject to vandalism, comprising a vertical coin entry slot, an upright path leading down to the coin detection mechanism, a nearby coin entry slot offset from the vertical coin entry slot for high anti-stuffing purposes, a structure having a sloping surface of a depth slightly exceeding that of largest coin usable in the pay telephone to one side and a slippery surface immediately behind the horizontal coin entry slot for receiving and sliding laterally an inserted coin from a position behind the horizontal coin entry slot to a tilted position on the sloping surface for rolling through the vertical coin entry slot into the upright path, and an object limiting rearward movement of the coin on the structure to a depth slightly exceeding the width of the largest coin usable in the pay telephone.

* * * * *